Aug. 25, 1953  J. P. RASOR  2,650,346
APPARATUS AND METHOD FOR TESTING PIPE COATING
Filed April 27, 1949  3 Sheets-Sheet 1
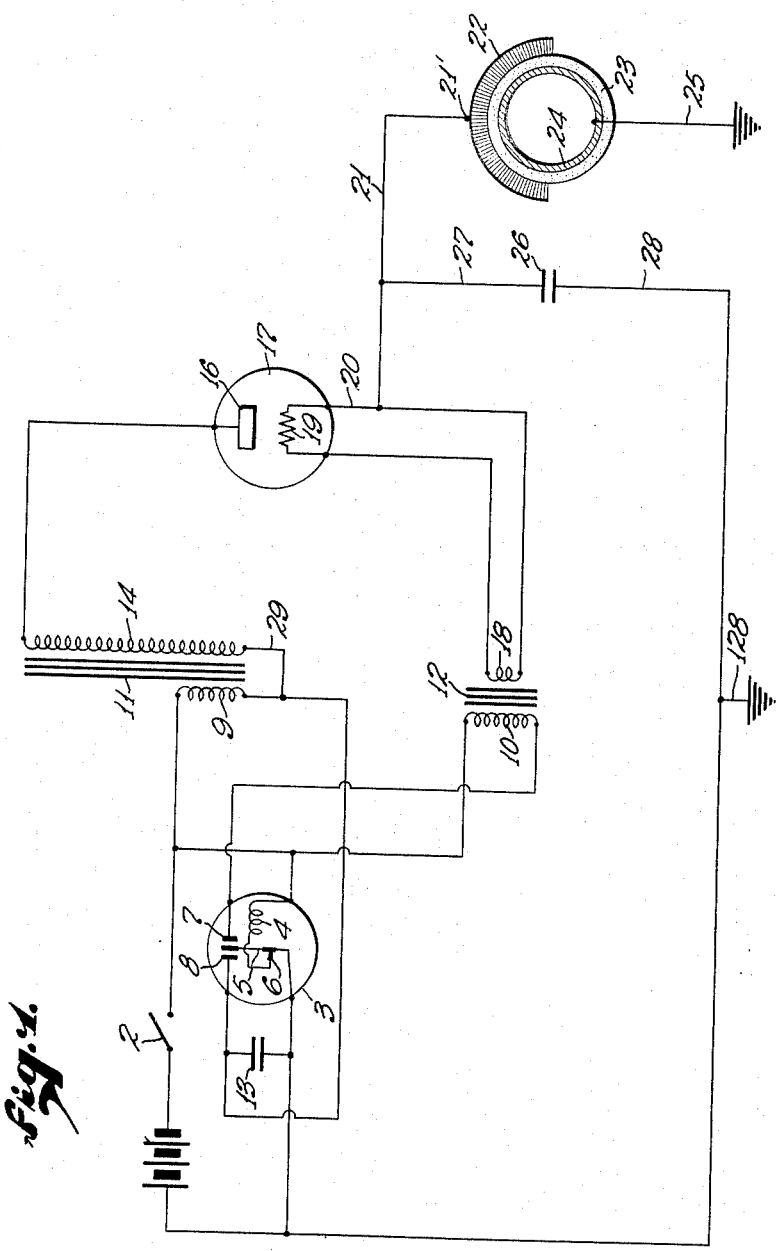
JOHN P. RASOR,
INVENTOR.
BY
Gerald H. Peterson
ATTORNEY.

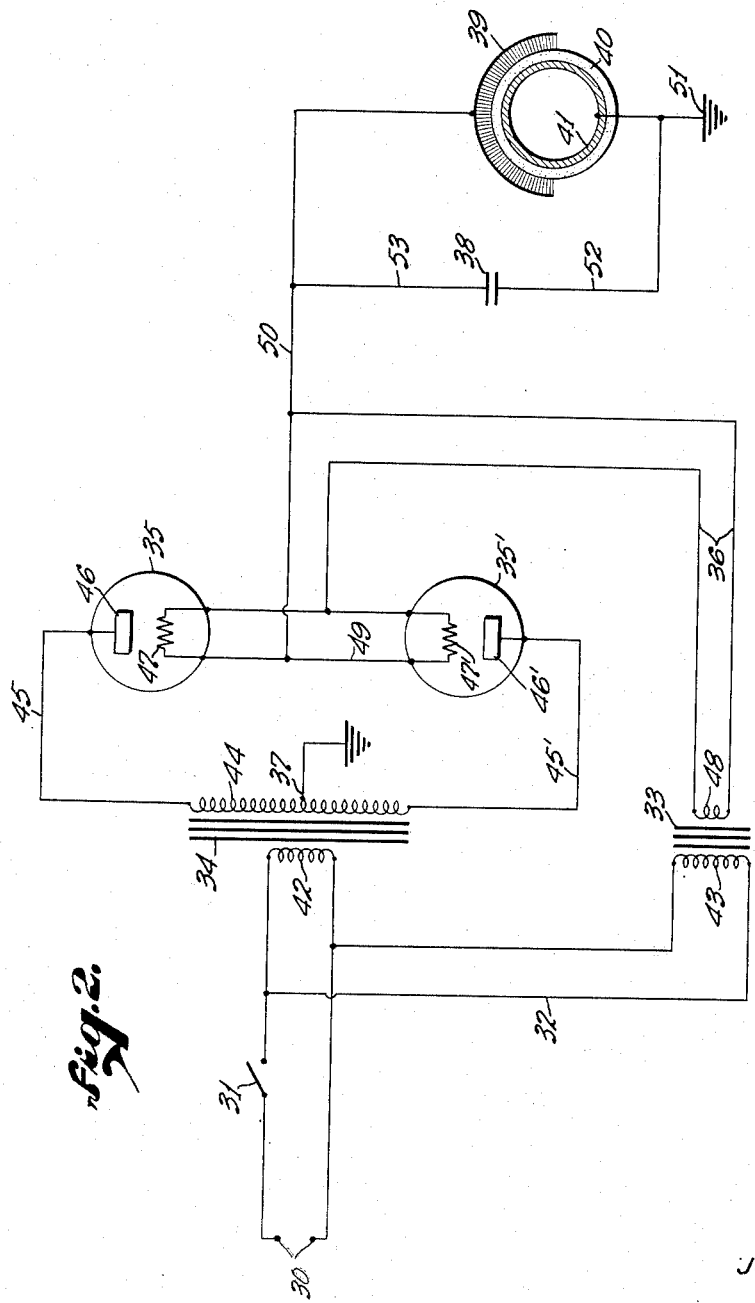

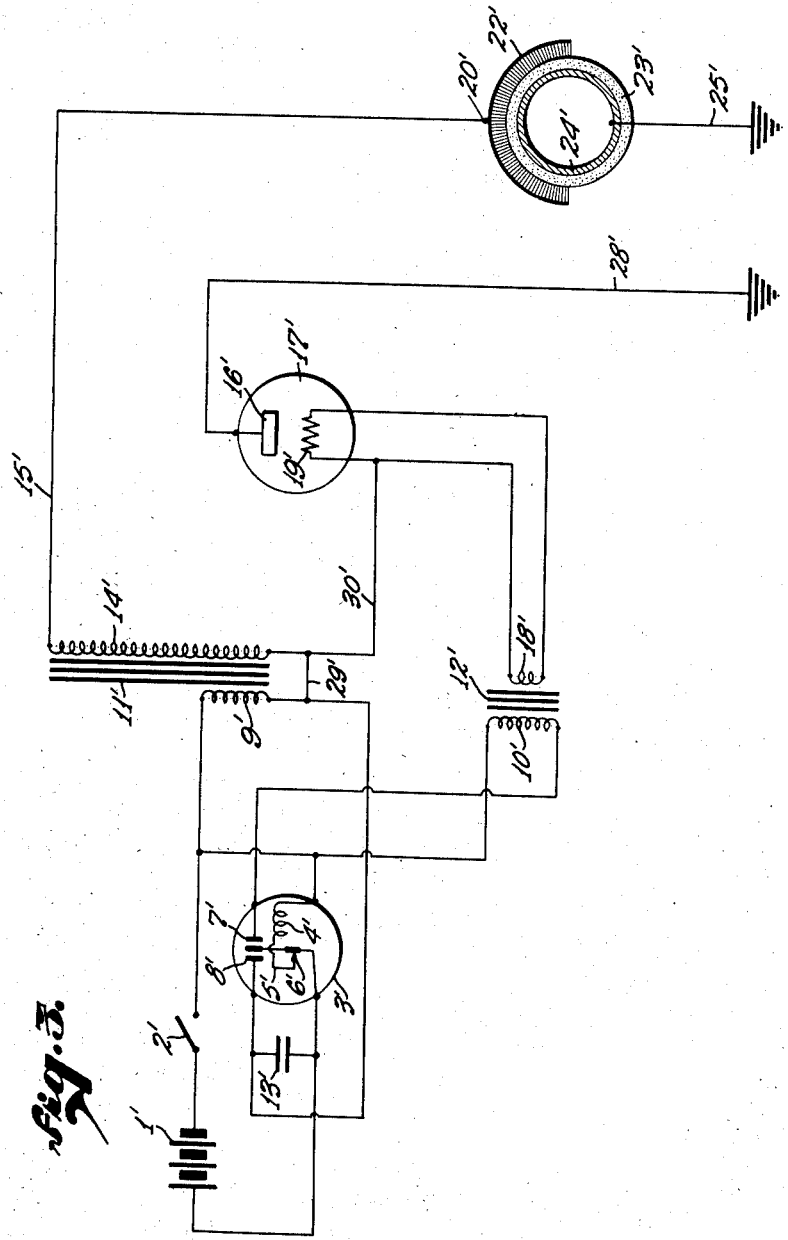

Patented Aug. 25, 1953

2,650,346

UNITED STATES PATENT OFFICE 2,650,346

APPARATUS AND METHOD FOR TESTING PIPE COATING

John P. Rasor, San Gabriel, Calif.

Application April 27, 1949, Serial No. 89,892

14 Claims. (Cl. 324—54)

This invention relates to an electrical device for testing pipe coating, particularly for locating holidays therein, and to a method of testing pipe coating.

In the construction of pipe lines for transmitting and distributing natural gas, petroleum and water, it is common practice to coat the pipe, such as steel or other metal pipe, with a coating which may be one or more layers of tar and paper, for example, to protect the pipe from the corrosive effects of electrolysis due to cathodic currents developed between moist ground and the metal pipe. Other coatings such as an asphalt coating material, Somastic, pipe-line enamel, various plastic coatings, such as Amercoat plastic coating, a vinyl coating, particularly very thin coatings of plastic material, are used. In order to make sure that the coatings are adequate for protecting the metallic pipe from the corrosive effects of electrolysis, it is necessary to test the coatings with a device which will indicate any imperfections in the coatings through which water might penetrate and come in contact with the metal pipe after the pipe has been placed underground. These imperfections, called "holidays," are usually caused by minute openings in the coating which may be caused by air bubbles, shrinkage cracks, etc., or, in the case of asphalt coating material, or tar coating material, by particles of coke or silica. Such imperfections are not readily visible or otherwise detected, but must be detected by a special device adapted therefor.

My invention relates to an improved device for testing such coating. Present equipment for testing coatings is usually comprised of an electrical energy source such as a six volt battery, a vibrating interrupter and a high-tension coil or transformer. High alternating potential thus developed is applied to the coating and where an imperfection occurs, a spark will jump from the probe surrounding the pie through the imperfection to the steel pipe closing the circuit between the coil and the grounded steel pipe. Alternating potentials from 5,000 to 20,000 volts are common in this application depending upon the type and thickness of the pipe coating. High potential thus developed is effectively an alternating current. Since this equipment is desirably portable for field application, the method of producing alternating current to supply the low tension primary windings of the transformer is practically limited to mechanical vibrators such as vibrators used in automobile radio equipment or similar vibrating reed interrupters. These devices produce an effective alternating current in transformer primaries but are also noted for non-uniform wave shapes of the transformer outputs. Whereas a normal alternating current generator develops a uniform sine-wave shape where the voltage rises and falls without abrupt changes through the cycle, a vibrator wave shape is even worse than such an alternating current for testing pipe coating because it is normally deformed and very high voltage is developed in parts of the cycle, particularly the development of a steep wave front with a high peak. In the latter case, very high potentials are developed for a very short duration of the cycle. This effect for testing pipe coating is a distinct disadvantage because it is desirable to have a sufficiently high voltage for test continuously applied by the probe as it is moved along the surface being tested. With such a voltage wave shape having high peaks, the voltage of the peaks will be high enough to rupture the good coating, while the lower voltage of the wave shape will not be high enough to detect a holiday in the coating; that is, with such a wave shape having high peaks, no adjustment is possible which will give satisfactory detection of imperfections throughout the whole period of the wave and at the same time not break through the good portions of the coating at the wave peaks.

In accordance with my invention, however, the discovery has been made that such disadvantages can be overcome by applying across the coating being tested a substantially constant unidirectional current voltage so that such test voltage is continuously applied as the testing probe is moved along the surface being tested. In accordance with this discovery of my invention, the testing probe may be moved along the surface being tested rapidly without skipping over holidays which, with devices of the prior art, would coincide with test voltages too low for detection. My invention makes it possible to apply the substantially constant test voltage to the coating being tested which voltage is higher than the voltage which will break through the good coating when alternating current or a voltage produced by a pulse generating device is used; that is, a low frequency alternating current of high voltage for short intervals, in other words, with steep wave peaks. The voltage here referred to is the peak voltage as measured, for example, by any device known to those skilled in the art for measuring the peak voltage, such as a spherical gap peak voltage measuring device or a crest-reading voltmeter.

It is an object of my invention to provide an electrical pipe coating testing device and a method of testing pipe coating which applies a high potential unidirectional or direct current to the coating being tested, particularly continuously applying the test voltage at a substantially constant value as the probe used for applying such voltage to the coating is moved therealong for testing, and thereby eliminates the undesirable features of various alternating wave shapes. It is another object of my invention to provide such a testing device and testing method which has a substantially lower electrical energy loss across the coating between the pipe and the testing probe due to the capacity of the system consisting of the probe, coating and metal pipe.

Other important objects and advantages will be apparent from the following description.

In general, in accordance with my invention, I develop a high voltage alternating current which is rectified to a high voltage unidirectional current and this high voltage unidirectional current is applied across the coating being tested between the metal pipe and an electrical probe which may be moved over or along the surface of the coating being tested. Advantage is taken of the capacity in the system consisting of the probe, dielectric coating and metallic pipe to store electrical charge which is then available for producing a spark through and thereby detecting holidays. In general, the test voltage will be from about 3,000 to 30,000 volts and the current from about 1 to 5 milliamperes and the power from about 5 to 15 watts, but may be from about 1 to 25 watts, depending upon the particular application. For some applications, voltages as high as from 15,000 to 30,000 may be used. In accordance with my invention, the voltage used may be from 50 to 100 per cent higher than the corresponding alternating current voltage of the prior art without breaking through the good portions of the coating.

In general, one embodiment of my device comprises an electrical energy source, such as a six volt storage battery, a means for developing an interrupted current for the primary of a transformer capable of producing a high voltage, which means may be such a vibrating interrupter as used in automobile radio equipment or similar vibrating reed interrupters, a high tension coil or transformer, and a means for rectifying the alternating output of such coil or transformer to supply a unidirectional or direct current of corresponding high potential to the testing probe, which applies such unidirectional or direct current across the pipe coating between the probe and the grounded steel pipe, and in general this involves the method of testing pipe coating with such a unidirectional or direct current system.

One embodiment which will illustrate and exemplify my invention will be described by reference to Figure 1. At 1 is shown a battery which may be a six volt storage battery which supplies the electrical energy for the testing device. When switch 2 is closed, current flows through interrupter 3, passing through solenoid actuating coil 4 causing reed 5, which is normally sprung against contact 6, to move toward said solenoid and make contact with contact point 7 while at the same time breaking contact point 6 so that reed 5 springs back to make contact 8 and remake contact 6. This causes a vibration of the reed and a corresponding making and breaking of contacts 7 and 8 causing a corresponding interrupted current flow in the lines leading to primaries 9 and 10 of high potential transformer 11 and low potential transformer 12, respectively. A condenser 13 is placed across the reed contact and contact 8 to increase the output of the high voltage transformer and to decrease contact sparking, as will be understood by those skilled in the art. Interrupter 3 may be a standard type radio double contact vibrator utilizing one set of contacts to supply high potential transformer 11 and the other set to supply low potential transformer 12. Or, a similar vibrator with only one such contact may be used to supply both of said transformers. The contact 8 of interrupter 3 is adjusted to provide a relatively long "make" to produce the required potential in high potential transformer 11.

High potential transformer 11 is an iron core transformer capable of producing potentials of from about 5,000 to 20,000 volts at from 1 to 2 milliamperes. From the secondary 14 of this transformer a high potential alternating current is led by way of line 15 to plate 16 high-voltage low-current type rectifier vacuum tube 17. Line 29 from secondary coil 14 of transformer 11 is connected as shown to complete the high potential circuit, or may be connected to ground to complete this circuit. This tube may be such a tube known in the trade as type 1B3GT or 8016. This is a half-wave high-vacuum low-current rectifier tube having a nominal rating of 20,000 volts at 2 milliamperes. The detail structure of this type of tube is described in Receiving Tube Manual of the Radio Corporation of America, 1947, Series RC15, page 61. A dry rectifier, such as a selenium or copper oxide rectifier, might also be used instead of such a tube, to the extent such a dry rectifier is effective. Moreover, two rectifier tubes may be used instead of one to effect full wave rectification, as shown in Figure 2, if desired. However, the capacity of the condenser 26, if used, and the capacity of the condenser consisting of probe, dielectric coating and metal pipe, effectively store up electrical charge to substantially smooth out any pulses that may result from half-wave rectification.

Secondary 18 of low-voltage transformer 12 delivers current to heat filament 19 of said rectifier tube 17. Since the circuit containing said secondary 18 and filament 19 is at high potential, it must be appropriately insulated. Instead of using transformer 12 to supply the current for heating filament 19, this filament may be heated by current from a separate battery source or from the battery 1 with a suitable resistance in the circuit to provide the proper voltage for the filament. In such cases, the battery and associated components will assume the high potential and it must be appropriately insulated. For ease in effecting such insulation, such a transformer as shown at 12 is preferred.

From filament 19 there leads, by way of lines 20 and 21, the desired high potential unidirectional or direct current to the testing probe 21, which as shown includes contact brush 22, contacting pipe coating 23 of the steel pipe 24. Pipe 24 is connected to ground or ground return lead 25, which completes the circuit to battery 1. Preferably condenser 26 may be connected across the coating and high potential output as shown by lead lines 27 from line 21 and line 28 from ground. In practice, line 128 to ground may be a trailing ground wire dragged behind the operator carrying the instrument.

When switch 2 is closed, direct current flows from six volt storage battery 1 to the vibrating interrupter 3. The interrupter 3 supplies the primaries of high potential transformer 11 and low potential transformer 12 with an interrupted current. The high potential transformer 11 is connected as an ignition coil and in order to obtain maximum potential the interrupter contacts for the high potential transformer are so adjusted as to have a long "make" or closed position. This circuit, including interrupter 3 and primary 9 of high potential transformer 11 operates as a standard ignition coil high potential system such as is common to automobile service, using condenser 13 to increase the high potential output. The filament low potential transformer 12 supplies about 0.2 ampere at about 2 volts to heat the filament 19 of the high potential rectifier vacuum tube 17. High potential alternating current flows from transformer 11 to rectifier 17 which passes only a unidirectional or direct current to the output circuit leads 20 and 21. The output potential may be from 5,000 to 20,000 volts direct current at 1 to 2 milliamperes.

This high potential unidirectional or direct current output is used for testing pipe coating 23 by applying it across such coating between a probe which may be a brush as shown at 22. The probe may be a suitable electrical conductor for applying the test voltage across the coating being tested. When such voltage is thus applied across the coating or is moved over or along the coating, imperfections or holidays become apparent because of the jumping of an audible spark through the imperfection.

Condenser 26 is preferably connected across this high potential output. This condenser acts as a reservoir for electric charge and accumulates the direct current pulses passed by rectifier tube 17 so that the potential applied across the coating being tested is substantially a uniform direct current. The capacity of this condenser should be large enough to provide a spark of sufficient intensity and sufficient duration to audibly detect imperferctions, but not so large as to create a shock hazard or produce a spark of so great an intensity that it may tend to burn the coating at points adjacent to the imperfection. In the system described, usually a condenser of about .00025 microfarad will be found satisfactory. Moreover, the capacity of this condenser should bear a relationship to the capacity of the system being tested, namely, the probe, coating, and steel pipe, because the system being tested is in effect a condenser connected in parallel with condenser 26. Accordingly, the capacity of these two condensers together should be adjusted to give the desired character to the spark. Condenser 26 may be a variable condenser.

A modified embodiment of my invention, adapted to be used with any relatively low voltage alternating current source such as the ordinary 60 cycle 110 volt standard electrical supply or a source from any conventional alternating current generator, is shown in Figure 2. Here 30 indicates such a source of alternating current, which, when switch 31 is closed, will be applied to the primary 42 of high potential transformer 34, preferably of the reactance type similar to those used by the neon sign industry, the distinguishing feature of which is the limitation on power output with heavy secondary loading, such as occurs upon spark discharge through a detected holiday. Current is also supplied through line 32 to the primary 43 of low voltage filament-lighting transformer 33.

The secondary 44 of transformer 34 is center-tapped to ground at 37. The respective high voltages from each of the two sections of the secondary 44 are led by lines 45 and 45' to the plates 46 and 46' of high voltage rectifying tubes 35 and 35'. These tubes may be the same as tube 17 of Figure 1 described above. Filaments 47 and 47' are heated by current from secondary 48 of low voltage transformer 33 by current through lines 36.

From line 49 connected to filaments 47 and 47' is led by way of line 50 the rectifier output current, which is a unidirectional full wave rectified alternating current, that is, substantially a direct current voltage to the probe 39 and therewith applied to the coating 40 being tested across the coating 40 between the probe 39 and the metallic pipe 41. The pipe 40 is grounded as at 51 to complete the testing circuit.

If the capacity of the system being tested, consisting of probe 39, coating 40 and pipe 41, is not sufficient to produce a substantially uniform voltage across the coating being tested or sufficient to act as a charge reservoir to produce a spark of sufficient intensity, or both, a condenser as at 38 may be added connected as by lines 52 and 53. This may be a variable condenser for ready adjustment of the character of the spark.

Still another modification of my invention is shown in Figure 3.

At 1' is shown a battery which may be a six volt storage battery which supplies the electrical energy for the testing device. When switch 2' is closed, current flows through interrupter 3', passing through solenoid actuating coil 4' causing reed 5', which is normally sprung against contact 6', to move toward said solenoid and make contact with contact point 7' while at the same time breaking contact point 6' so that reed 5' springs back to make contact 8' and remake contact 6'. This causes a vibration of the reed and a corresponding making and breaking of contacts 7' and 8' causing a corresponding interrupted current flow in the lines leading to primaries 9' and 10' of high potential transformer 11' and low potential transformer 12', respectively. A condenser 13' is placed across the reed contact and contact 8' to increase the output of the high voltage transformer and to decrease contact sparking, as will be understood by those skilled in the art. Interrupter 3' may be a standard type radio double contact vibrator utilizing one set of contacts to supply high potential transformer 11' and the other set to supply low potential transformer 12'. Or, a similar vibrator with only one such contact may be used to supply both of such transformers. The contact 8' of interrupter 3' is adjusted to provide a relatively long "make" to produce the required potential in high potential transformer 11'.

High potential transformer 11' is an iron core transformer capable of producing potentials of from about 5,000 to 20,000 volts at from about 1 to 2 milliamperes. From the secondary 14' of this transformer, the high potential is led by way of line 15' to testing probe 20', which, as shown, includes contact brush 22' contacting pipe coating 23' of the steel pipe 24'. Pipe 24' is connected to ground as by line 25'. The other end of secondary coil 14' is connected to the filament 19' by line 30', as shown. The plate 16' of the tube 17' is connected to ground by line 28', as shown. This completes the high potential circuit with the rectifier tube 17' and the test piece connected in series in this high potential circuit. The rectifier tube 17' acts as a half wave rectifier and accordingly a unidirectional high potential current is applied to the coating 23' being tested. The condenser system consisting of metallic probe 20', dielectric coating 23' and metallic pipe 24' supplies capacity for storing up charge to be applied for testing.

It will be understood that the specific embodiments of my invention described above are intended to illustrate and exemplify my invention and are not necessarily intended as a limitation thereon and that modifications of my invention may be made within the scope of the following claims which define the invention sought to be covered by Letters Patent.

This application is a continuation-in-part of my copending application Serial No. 63,777, filed December 6, 1948, which is now abandoned.

I claim:

1. In an electrical device for testing pipe coating on a metal pipe by applying a high test voltage across the coating between the metal of the pipe and an electrical probe adapted to conform to and contact a portion of the outside of said coating, means for supplying a high voltage unidirectional current at a voltage above 3000 volts and at a power above 1 watt, said means having two electrical connections therefrom, one for electrical connection to the metal of the pipe and the other for electrical connection to an electrical probe adapted to be applied to and moved over the coating to be tested to apply said high voltage unidirectional current across said coating between said probe and the metal of said pipe, said probe, coating and metal pipe constituting a condenser of such capacity causing an electrical energy loss with high voltage alternating current and for storing unidirectional electrical charge to cause a unidirectional spark to jump through holidays in the coating between said probe and metal pipe.

2. In a device as defined in claim 1 in which said means for supplying a high voltage unidirectional current comprises a means for producing a high voltage alternating current above 3000 volts and a means for rectifying said high voltage alternating current to a high voltage unidirectional current.

3. A device as defined in claim 1 having a condenser connected across said two electrical connections.

4. A device as defined in claim 1 having a variable condenser across said two electrical connections.

5. An electrical device for testing pipe coating on a metal pipe by applying a high test voltage across the coating between the metal of the pipe and an electrical probe adapted to conform to and contact a portion of the outside of said coating, comprising an electrical means for producing a high voltage unidirectional current at a voltage above 3000 volts and at a power above 1 watt, said means having two electrical connections leading therefrom, one of which is electrically connected to a lead for electrical connection to ground to establish electrical connection to the grounded metal of said pipe, and the other of which is electrically connected to an electrical probe adapted to be applied to the surface of said coating and moved thereon so that said high voltage unidirectional current is thus applied across the coating, said probe, coating and metal pipe constituting a condenser of such capacity causing an electrical energy loss with high voltage alternating current and for storing unidirectional electrical charge to cause a unidirectional spark to jump through holidays in the coating between said probe and metal pipe.

6. In an electrical device for testing pipe coating on a metal pipe for imperfections, a relatively low voltage direct current source of electrical energy, an interrupter connected to said source for supplying an interrupted current therefrom, means supplying said interrupted current to the primary of a high potential transformer for converting said interrupted current into high potential alternating current above 3000 volts, a high-potential low-current rectifying vacuum tube for rectifying said high potential alternating current to high potential direct current at a voltage above 3000 volts and at a power above 1 watt, said tube having a plate and a heated filament, means for supplying said high potential alternating current to the plate of said high-potential low-current rectifier vacuum tube, means for supplying a portion of said interrupted current to the primary of a relatively low voltage transformer, means for applying the low voltage from said low-voltage transformer to heat the filament of said rectifier vacuum tube, an electrical probe for applying said high potential direct current across the pipe coating being tested adapted to conform to and contact a portion of the outside of said coating, means for connecting said probe to the high potential direct current output of said rectifier tube, means electrically connecting the metal of said pipe in contact with said coating being tested with the high potential transformer to complete the high potential circuit, said probe, coating and metal pipe constituting a condenser of such capacity causing an electrical energy loss with high voltage alternating current and for storing unidirectional electrical charge to cause a unidirectional spark to jump through holidays in the coating between said probe and metal pipe, and a condenser across said high potential output in parallel with said probe, coating and metal pipe.

7. In an electrical device for testing pipe coating on a metal pipe for imperfections, a relatively low voltage direct current source of electrical energy, an interrupter connected to said source for supplying an interrupted current therefrom, means supplying said interrupted current to the primary of a high potential transformer for converting said interrupted current into high potential alternating current above 3000 volts, a high-potential low-current rectifying vacuum tube for rectifying said high potential alternating current to high potential direct current at a voltage above 3000 volts and at a power above 1 watt, said tube having a plate and a heated filament, means for supplying said high potential alternating current to the plate of said high-potential low-current rectifier vacuum tube, and means for connecting an electrical probe adapted to conform to and contact a portion of the outside of said coating for applying said high potential direct current across the pipe coating being tested to the high potential direct current output of said rectifier tube, said probe, coating and metal pipe constituting a condenser of such capacity causing an electrical energy loss with high voltage alternating current and for storing unidirectional electrical charge to cause a unidirectional spark to jump through holidays in the coating between said probe and metal pipe.

8. In an electrical device for testing pipe coating on a metal pipe for holidays, a relatively low voltage alternating current source of electrical energy, a transformer for substantially raising the voltage of said alternating current, said transformer being center-tapped to ground, a pair of high-potential low-current rectifying vacuum tubes, each having plates, for rectifying said high potential alternating current to high potential direct current, a lead from each of the high potential terminals of the secondary of said high potential transformer to each of said plates, means for connecting the rectified high voltage unidirectional current from said rectifier tubes to an electrical probe adapted to conform to and contact a portion of the outside of said coating for applying the resulting high potential direct current across the pipe coating being tested, said probe, coating and metal pipe constituting a condenser of such capacity causing an electrical energy loss with high voltage alternating current and for storing unidirectional electrical charge to cause a unidirectional spark to jump through holidays in the coating between said probe and metal pipe.

9. In an electrical device for testing pipe coating on a metal pipe for imperfections, a relatively low voltage direct current source of electrical energy, an interrupter connected to said source for supplying an interrupted current therefrom, means supplying said interrupted current to the primary of a high potential transformer for converting said interrupted current into high potential alternating current above 3000 volts, means for connecting the high voltage terminal of the secondary of said high voltage transformer to a probe adapted to conform to and contact a portion of the outside of said coating for applying high potential unidirectional current across the pipe coating being tested, a high-potential low-current rectifying vacuum tube for rectifying said high potential alternating current to high potential direct current at a voltage above 3000 volts and at a power above 1 watt, said tube having a plate and a heated filament, means for connecting the other terminal of the secondary of said high potential transformer to the filament of said tube, and means for connecting the plate of said tube to the metal of said pipe by way of ground, said probe, coating and metal pipe constituting a condenser of such capacity causing an electrical energy loss with high voltage alternating current and for storing unidirectional electrical charge to cause a unidirectional spark to jump through holidays in the coating between said probe and metal pipe.

10. In an electrical device for testing pipe coating on a metal pipe for holiday imperfections therein, a battery supplying a low voltage direct current, an interrupter connected to said battery for interrupting current therefrom, a condenser across said interrupter and in parallel therewith, means connecting said interrupter to the primary of a high potential transformer for converting the interrupted current into high potential alternating current, a half-wave, high-vacuum, high-potential, low-current rectifying vacuum tube for rectifying said high potential alternating current to high potential direct current, said tube having a plate and a heated filament, means for supplying said high potential alternating current to the plate of said high-potential low-current rectifier vacuum tube, means for supplying a portion of said interrupted current to the primary of a relatively low voltage transformer, means for applying the low voltage from said low-voltage transformer to heat the filament of said rectifier vacuum tube, an electrical probe adapted to conform to and contact a portion of the outside of said coating for applying said high potential direct current across the pipe coating being tested, means for connecting said probe to the high potential direct current output of said rectifier tube, means electrically connecting the metal of said pipe in contact with said coating being tested with the high potential transformer to complete the high potential circuit, said probe, coating and metal pipe constituting a condenser of such capacity causing an electrical energy loss with high voltage alternating current and for storing unidirectional electrical charge to cause a unidirectional spark to jump through holidays in the coating between said probe and metal pipe, and a condenser across said high potential output in parallel with said probe, coating and metal pipe.

11. In the method of testing pipe coating for holidays in which the coating is a relatively thin layer of dielectric material of high dielectric strength and high resistivity on the outside of metal pipe for protecting the metal pipe from corrosion when buried under ground and in which a high test voltage is applied across the coating between the metal of the pipe and an electrical probe moved along the coated pipe in contact with the outside of said coating such that the system consisting of probe, coating and metal pipe constitutes a condenser of sufficient capacity so that high voltage alternating test current causes a resulting electrical energy loss due to the capacity of such condenser, the improvement which comprises applying a high unidirectional voltage across the coating between said probe and the metal of said pipe and storing electrical charge on said condenser consisting of probe, coating and metal pipe to thereby cause a unidirectional spark to jump through holidays between said probe and the metal of said pipe.

12. The method as defined in claim 11 in which said unidirectional voltage is higher than an alternating current voltage just high enough to break through good portions of said coating.

13. The method as defined in claim 11 in which said unidirectional voltage is within the range of about 3,000 to 30,000 volts.

14. The method as defined in claim 11 in which said probe is moved along the surface of the coating and said unidirectional voltage is substantially constant, is higher than an alternating current voltage just high enough to break through good portions of said coating, and is within the range of about 5,000 to 20,000 volts.

JOHN P. RASOR.

References Cited in the file of this patent

UNITED STATES PATENTS

| Number | Name | Date |
|---|---|---|
| 1,253,211 | Chubb | Jan. 15, 1918 |
| 1,448,583 | Van Der Bijl | Mar. 13, 1923 |
| 1,886,682 | Hubbard | Nov. 8, 1932 |
| 1,921,461 | Garstang | Aug. 8, 1933 |
| 1,940,496 | James | Dec. 19, 1933 |
| 1,943,183 | Mitchell | Jan. 9, 1934 |
| 1,946,563 | Barrett | Feb. 13, 1934 |
| 1,950,484 | Clarvoe | Mar. 13, 1934 |
| 2,087,783 | Savage | July 20, 1937 |
| 2,231,873 | Barrett | Feb. 18, 1941 |
| 2,276,796 | Rogers | Mar. 17, 1942 |
| 2,332,182 | Stearns | Oct. 19, 1943 |
| 2,456,453 | Shailor | Dec. 14, 1948 |

OTHER REFERENCES

A. I. E. E. Technical Paper 45-66, December 1944, titled "A Portable Instrument for Measuring Insulation Resistance at High Voltage" by Atkinson and Taylor, pages 1 to 6.